March 24, 1931.   B. S. GLAGOLIN   1,797,286
STAGE MOUNTING FOR CINEMATOGRAPHIC PICTURES
Filed March 22, 1928
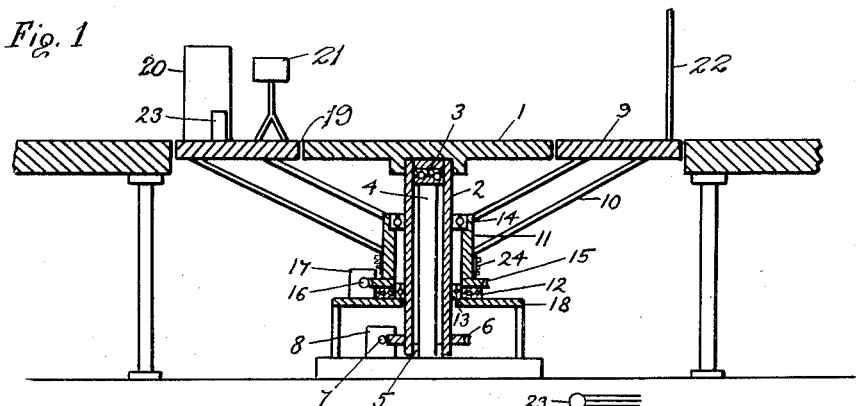
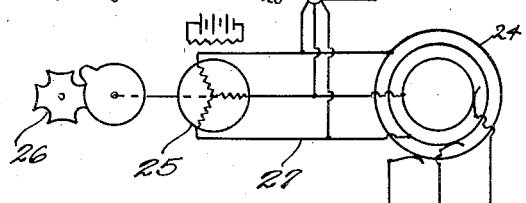
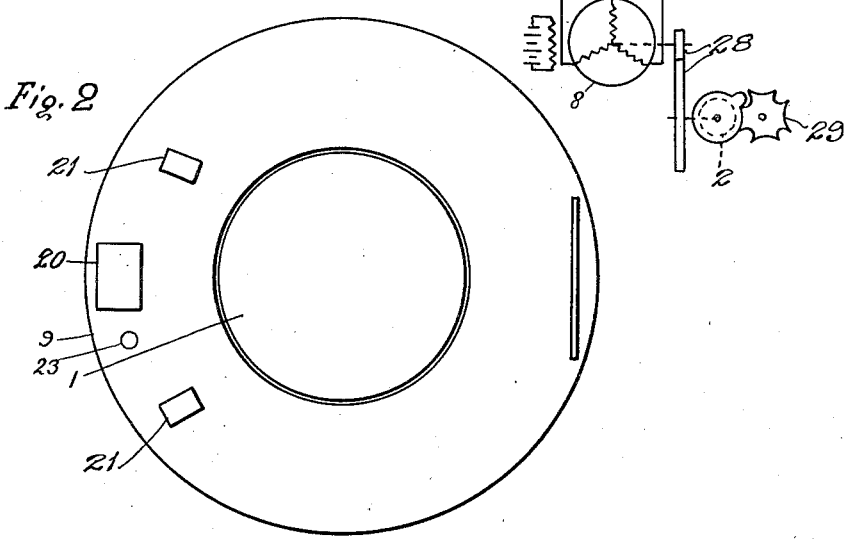
Boris S. Glagolin
INVENTOR
BY John P. Nixonow
ATTORNEY Patented Mar. 24, 1931

1,797,286

UNITED STATES PATENT OFFICE

BORIS S. GLAGOLIN, OF NEW YORK, N. Y.

STAGE MOUNTING FOR CINEMATOGRAPHIC PICTURES

Application filed March 22, 1928. Serial No. 263,718.

My invention relates to the stage mounting for cinematographic or motion pictures and has a particular reference to the arrangement of a movable stage.

The object of my invention is to provide an arrangement whereby different portions of the stage for taking motion pictures can be moved at a different rate of speed, one of these portions containing also the camera for taking pictures. This arrangement can be used to produce special effects by uncovering gradually or suddenly different portions of the stage setting so as to create an impression with the observer of the pictures, of a more intimate and personal contact with the scenery and action on the stage.

The further object of my invention is to provide a stage which can be moved in steps, rhythmically and in synchronism with a certain music. This arrangement may be especially useful in taking pictures of dancing artists or groups of artists.

My invention is more fully described in the accompanying specification and drawing in which—

Fig. 1 is a sectional elevation of my stage arrangement, Fig. 2 is a plan view of same, and Fig. 3 is a diagrammatic view of electrical connections.

My stage arrangement consists of a central round stage 1 mounted on a tube 2 which is supported on a ball bearing 3 on a central pillar 4. The tube 2 is guided in its lower portion by means of bearings 5 and is provided with a gear wheel 6 in mesh with a worm 7 on the shaft of an electric motor 8. It is understood of course that any other suitable drive or transmission may be employed to rotate the stage 1 on the central pillar or post 4.

The central stage 1 is surrounded with a circular or ring stage 9 supported with braces 10 on a tube 11. This tube rests on a bearing 12 and is separated from the tube 2 by bearings 13 and 14. It has a worm gear 15 in mesh with a worm 16 on the shaft of an electric motor 17.

The motor 17 and the bearings 12 are mounted on a raised platform 18. The ring stage 9 is placed in a circular aperture in the floor 19 of the motion picture studio. This is not necessary, however, and it may operate independently if provided with safety railings on the outside of the ring 9.

The studio floor may be made of a sound-proof material if it is intended to make Vitaphone pictures, or pictures combined with vocal effect.

A camera in a sound-proof cage 20 is mounted on the stage 9, also flood-lights 21. On the opposite side of the stage different settings 22 are placed, scenery, furniture etc.

A controller 23 is placed on the stage 9 near the cage 20. This controller is connected electrically with a source of electric power and with motors 8 and 17 by means of contact rings 24 on the tube 11.

The operation of my arrangement is as follows.

Dancers are placed on the central stage 1 which is set in a slow rotary movement. A director can control this movement by means of controller 23, may stop it entirely or reverse. With this arrangement it becomes possible with a single camera to take pictures from different angles, also to obtain a more striking and vivid effect by following the dancer's movements and presenting them always from the most advantageous point of view. This arrangement eliminates the necessity to use several cameras at one time, patching together the films afterwards with a great waste of the unused films.

Other special effects may be obtained with my arrangement, for instance, the play of a mother with a child viewed from different angles, the entrance of the hero into new surroundings, by quickly opening these surroundings to the observer's view before the hero himself appears.

A more rapid relative movement may be obtained by rotating the two stages in different directions, and it may be slowed down by rotating in the same direction with different velocities.

For taking pictures of dancers performing rhythmical movements of waltz, two step and similar dances, it is important that the movement of the stage should be also intermittently rhythmical, in order to accentuate the effect of the dance on the observers. It is also desirable that the rhythmical movement of the stage should be periodically in synchronism with the movement of the shutter in the camera. For this purpose I use synchronous motors 8 and 17 rotating in synchronism with a motor 25 which operates a shutter by means of some well known intermittent mechanism 26. These motors can be controlled by a controller 23 the current for which is supplied by wires 27 through a system of contact rings similar to rings 24. The motor 8 (the other motor is not shown on the diagrammatic drawing Fig. 3) operates the stage 1 through a chain of gears 28 and by means of an intermittently rotating mechanism 29.

Important advantages of my arrangement are that it provides means for obtaining new effects in the art of making motion pictures, by changing scenery either gradually, or more or less quickly, also by permitting continuous exposure of moving objects from the most advantageous points of view, eliminating the necessity of employing several cameras at one time.

I claim as my invention:

In a stage mounting for cinematographic pictures, the combination with a circular stage for artists, of a rotative mounting for said stage, a ring-shaped stage surrounding said circular stage, a rotative mounting for said stage, means to independently rotate said stages, means to control said rotation, said means being located on said ring-shaped stage, and a cinematographic camera on said ring-shaped stage, said ring-shaped stage being adapted to support scenery opposite said camera.

Signed at New York, in the county of New York and State of New York, this 20th day of March, A. D. 1928.

BORIS S. GLAGOLIN.